United States Patent [19]

Morehouse et al.

[11] Patent Number: 5,161,770
[45] Date of Patent: Nov. 10, 1992

[54] SHOCK ABSORBENT MOUNTING ARRANGEMENT FOR DISK DRIVE OR OTHER COMPONENT

[75] Inventors: James H. Morehouse, Jamestown; James A. Dunckley; David M. Furay, both of Boulder; John A. Mount, Longmont; Steven B. Volk, Boulder, all of Colo.

[73] Assignee: Integral Peripherals, Inc., Boulder, Colo.

[21] Appl. No.: 630,136

[22] Filed: Dec. 19, 1990

[51] Int. Cl.5 .......................................... F16M 13/00
[52] U.S. Cl. ................................. 248/632; 206/444; 360/133
[58] Field of Search .............. 248/638, 636, 632, 634, 248/560; 206/444, 592, 523; 360/133, 97.01, 97.02

[56] References Cited

U.S. PATENT DOCUMENTS

| 4,443,874 | 4/1984 | Steenberg | 206/444 X |
| 4,473,153 | 9/1984 | Colangelo | 206/444 X |
| 4,515,272 | 5/1985 | Newhouse | 206/592 |
| 4,568,994 | 2/1986 | Lynch | 206/444 X |
| 4,655,348 | 4/1987 | Takagi | 206/444 |
| 4,724,501 | 2/1988 | Buchwald | 206/444 X |
| 4,824,059 | 4/1989 | Butler | 206/592 X |

FOREIGN PATENT DOCUMENTS

| 98580 | 6/1985 | Japan | 360/133 |
| 17281 | 1/1986 | Japan | 360/133 |

Primary Examiner—J. Franklin Foss
Attorney, Agent, or Firm—Skjerven, Morrill, MacPherson, Franklin & Friel

[57] ABSTRACT

A shock absorbent jacket for mounting a disk drive or other component is disclosed.

1 Claim, 5 Drawing Sheets

SHOCK ABSORBENT MOUNTING ARRANGEMENT FOR DISK DRIVE OR OTHER COMPONENT

FIELD OF THE INVENTION

This invention relates to shock absorbent mounting arrangements for protecting various types of components and devices against external shock forces, and in particular to such arrangements for computer disk drives.

BACKGROUND OF THE INVENTION

Various systems are known for mounting a component or device on an instrument, machine or other object so as to protect or isolate it from external vibrational or shock forces. A foam rubber or other deformable pad placed under the component is one of the simplest arrangements. Alternatively, the component may be mounted with elastomeric grommets or isolators which typically include a hole through which a screw or other fastener is inserted to provide the component with a positive attachment to the surface on which it is mounted.

Disk drives used in computers, particularly small portable computers, are one type of delicate component which needs to be protected against external vibration and shocks. There are essentially two types of such disk drives, referred to as "dynamic loading" and "contact start/stop", respectively. In a dynamic loading drive, the actuator or carriage on which the read/write head is mounted is withdrawn to a position away from the disk when the drive is not operating. In a contact start/stop drive the read/write head rests at a "park" position on the surface of the disk (typically the inner portion thereof) when the drive is not operating.

In dynamic loading drives, the bearings of the spindle-motor are particularly vulnerable. A sizeable shock imposed on the drive can plastically deform or Brinell the races in these bearings. Such deformations in the bearing races may cause the disk to wobble in a lateral direction as it rotates (a condition referred to as "high runout") and may create tracking problems. Acoustic degradation caused by the clicking of the Brinelled bearing may also result. Moreover, Brinelling creates undue friction in the bearing and may slow down the rotation of the disk or prevent the disk from rotating altogether.

In contact start/stop drives, a shock on the drive may lead to "head slap", in which the head is lifted from and falls back to the surface of the disk. Similarly, if either type of drive is jolted during operation, the head may be forced through the thin boundary layer of air upon which it rides into sharp contact with the surface of the disk, a phenomenon known as "head crash". Either of these occurrences may damage the head and/or the disk.

These problems have become all the more common with the advent of "laptop" and "hand held" computers, which are often used in severe environments, being bumped or dropped repeatedly as they are moved from place to place. The disk drives in these computers are accordingly subjected to a variety of translational or rotary shocks.

To alleviate these problems, disk drives have typically been mounted with elastomeric grommets and screws or with isolators having studs attached to the ends. Both of these methods have disadvantages. First, grommets or isolators take up significant space, and space is at a premium in a small computer. Second, they involve several parts which must be assembled and installed. The extra expense arising from these steps can be substantial in the context of mounting a relatively small component such as a disk drive in a laptop, hand held or other miniature computer.

A third major disadvantage of conventional mounting techniques is that they generally permit purely translational (linear) shocks to be coupled into rotational shocks. This occurs because in general the resultant vector of the individual forces which are applied to the drive through the grommets or isolators when the computer is displaced suddenly in translation is not directed through the center of gravity of the drive. The drive therefore experiences a rotational moment of force as well as a translational force. This may be observed as a tendency of the drive to tilt or tip in the direction from which the force originates. Rotational shocks are particularly troublesome for disk drives that include rotary actuators or carriages because they tend to cause the rotary actuator or carriage to rotate about its pivot point, thereby risking potentially damaging contact between the read/write head and the disk or causing off-track errors during read and write operations. The only way to decouple the translational and rotational forces is to insure that the resultant of any translational force imposed on the drive will pass through the drive's center of gravity.

SUMMARY OF THE INVENTION

In accordance with this invention, a disk drive or other component is enclosed in a jacket fabricated from a resilient, shock absorbent material such as foam rubber. The jacket may enclose the component completely or partially, or more than one jacket may be used, provided in any case that the component is protected against shock forces in all directions. The jacket may be manufactured from a foamed or other soft material or from a solid material of moderate stiffness into which a pattern of ribs, beads, ripples or other shapes is impressed.

The jacket-enclosed component is placed and supported in a cavity or recess in a computer or other instrument. The cavity is sized and shaped in such a way that the jacket is loosely held between the surface of the component and the inner surface of the cavity. The cavity itself may be completely enclosed, or it may have various openings. For example, it may take the form of a cage or lattice arrangement on one or more sides. It is essential, however, that the surfaces which define the cavity be positioned so that they function cooperatively with the shock absorbent jacket to protect the disk drive or other component from shocks in any direction.

A mounting arrangement according to this invention takes up very little space, is inexpensive to manufacture and install, and avoids the undesirable coupling of translational into rotational shocks by assuring that the resultant force imposed on the component in the event of a linear shock will always be directed through its center of gravity. In addition to preventing the coupling of translational into rotary forces, an embodiment according to this invention provides a high degree of isolation from rotary as well as translational forces.

It is another advantage of this invention that the component can be placed into its protective jacket immediately, prior to handling, so that it is protected during installation into the computer or other instrument.

In an alternative embodiment according to this invention, the shock absorbent jacket is manufactured from an electrically conductive material so that it protects the component against damage from electrostatic discharge and electromagnetic radiation.

The applicability of this invention is not limited to any particular type of component but includes any device or mechanism that does not require a rigid physical connection with the object on which it is to be mounted.

BRIEF DESCRIPTION OF THE DRAWING

FIG. 5A to 5F show in cross section illustrative patterns into which a shock absorbent jacket in accordance with the invention may be formed.

DETAILED DESCRIPTION OF THE INVENTION

Figure 1:
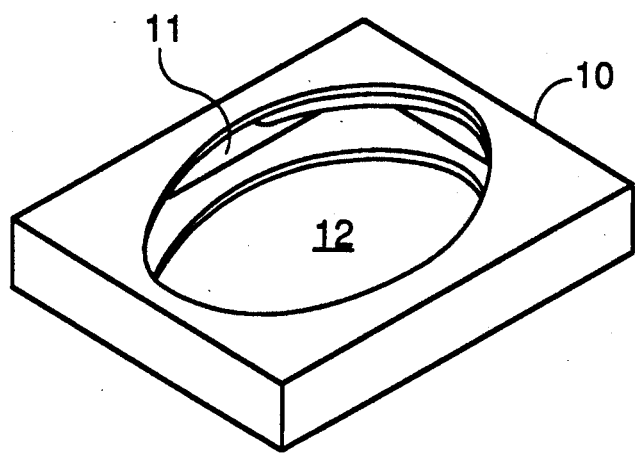
FIG. 1 shows a perspective view of a shock absorbent jacket in accordance with the invention.

FIG. 1 shows a shock absorbent jacket 10 in accordance with the invention. Jacket 10 is fabricated or molded from foam rubber or another soft material. Oval-shaped apertures 11 and 12 in jacket 10 are sized to permit a disk drive to be inserted into the jacket.

Figure 2:
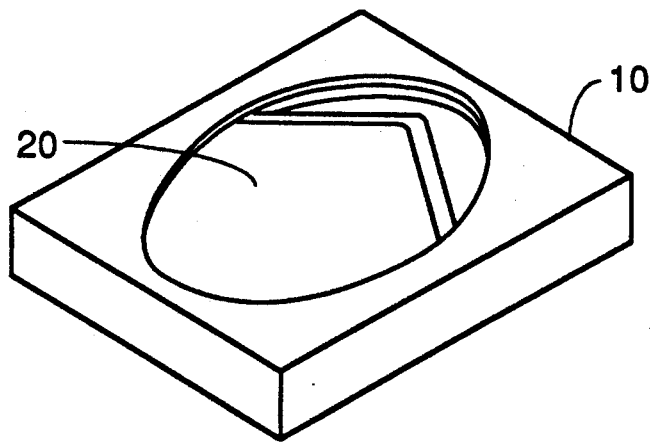
FIG. 2 shows the jacket of FIG. 1 with a disk drive enclosed.

FIG. 2 shows jacket 10 with a disk drive 20 enclosed inside.

Figure 3:
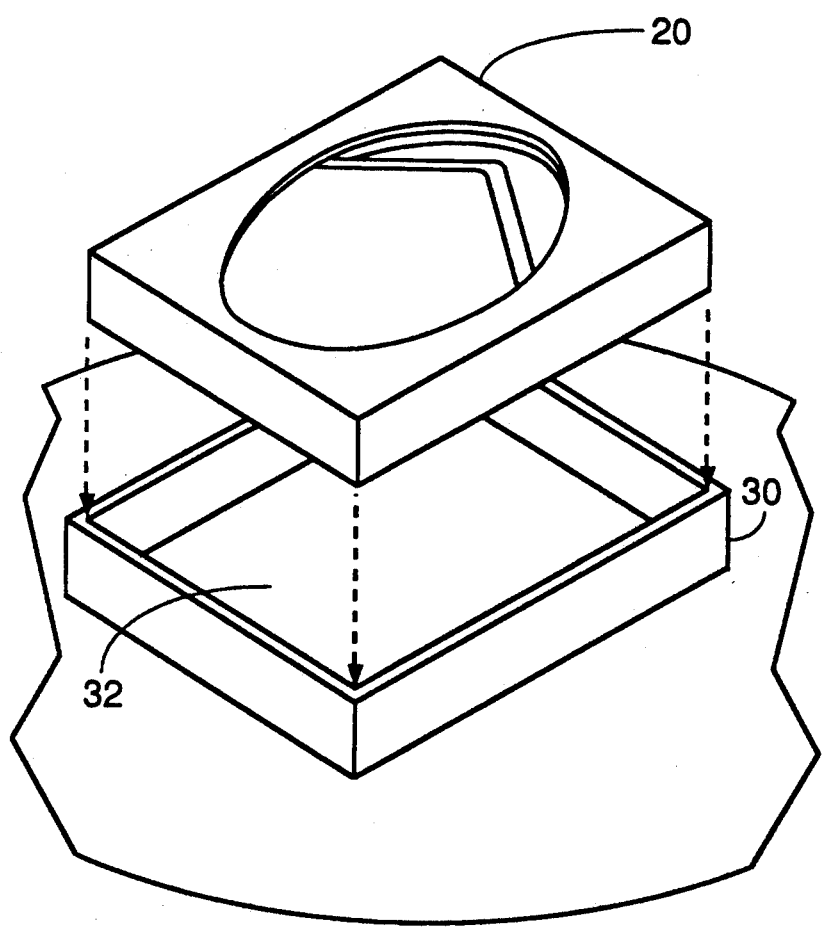
FIG. 3 shows a disk drive mounted in a computer housing in accordance with the invention.

FIG. 3 illustrates the manner in which disk drive 20 is mounted in a housing 31 of a computer. Jacket 10 with disk drive 20 inside is placed within the perimeter of a fence 30, which is attached to housing 31 and defines a cavity 32. The respective heights of jacket 10 and fence 30 are essentially equal. After jacket 10 and drive 20 have been placed into cavity 32, a planar cover (not shown) is placed on top of fence 30, thereby securing disk drive 20 in place. It has been found that for maximum protection against shock forces a space of approximately 0.5 to 1.5 mm should be allowed between the external surfaces of drive 20 and the opposing surfaces of fence 30, computer housing 31 and the cover. The thickness of jacket 10 should fill this space so that drive 20 is loosely but securely held in cavity 32.

If the center of gravity of drive 20 is at or near its physical center (as is normally the case), the material of which jacket 10 is fabricated should be uniform in terms of thickness and stiffness on all sides of drive 20. This will insure that the resultant of any force applied to drive 20 through jacket 10 will be substantially directed through its center of gravity. If the center of gravity of drive 20 is significantly to one side of its physical center, jacket 10 should be made somewhat thicker and/or stiffer, and therefore capable of absorbing a greater shock force, on that side. Otherwise, drive 20 will tend to rotate within cavity 32 in the presence of a translational force and the "coupling" referred to above will occur.

Figure 4:
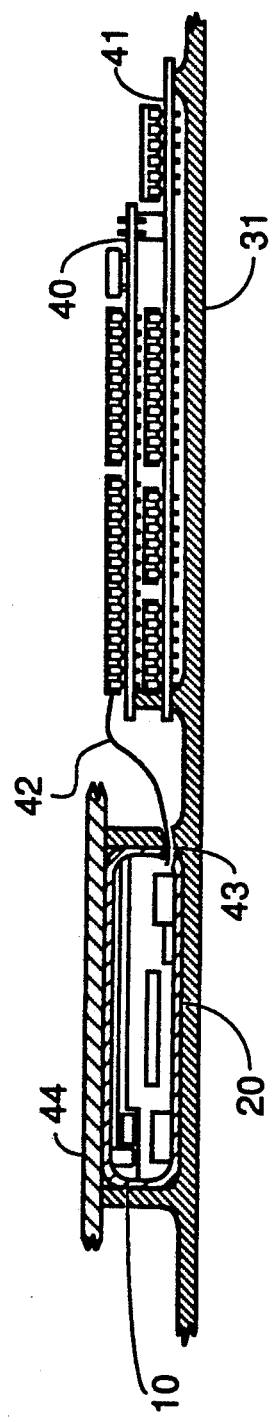
FIG. 4 shows in cross section a disk drive and associated circuit boards mounted in a computer housing in accordance with the invention.
Figure 5A:
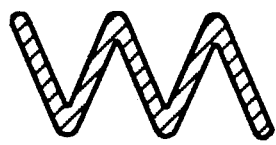
Figure 5B:
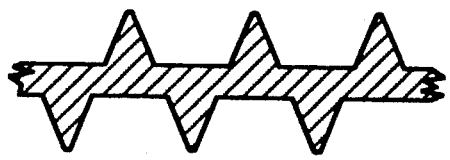
Figure 5C:
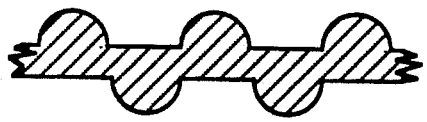
Figure 5D:
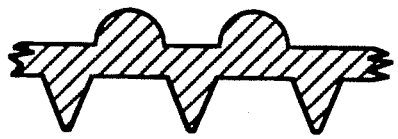
Figure 5E:
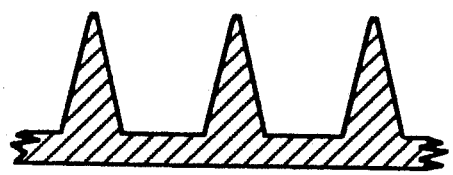

FIG. 4 shows a cross-sectional view of the structure just described and illustrates in addition the connection of disk drive 20 to drive controller board 40 and computer motherboard 41 via a flexible connector 42. Flexible connector 42 passes through a channel 43 in fence 30. A cover 44, which contacts the top edge of fence 30, forms a closed cavity within which disk drive 20 rests. Cover 44 and housing 31 are preferably made of molded plastic and are designed to fit together so as to create a rigid or semi-rigid cavity within which disk drive 20 is lodged.

Drive controller board 40, which is associated with and controls disk drive 20, is "piggybacked" onto motherboard 41, which contains circuits and devices for the computer. The piggyback assembly of drive controller board 40 and motherboard 41 is typically attached to housing 31 by screws or clips which fit into threaded sockets or snap-tight devices in housing 31. It will be noted that the structure of FIG. 4 provides a low profile for the assembly of disk drive 20, drive controller board 40 and motherboard 41 which is particularly suitable for a laptop, hand held or other small computer.

The advantages of the arrangements described above and shown in FIGS. 1-4 will be evident to those skilled in the art. Disk drive 20 can be inserted into shock absorbent jacket 10 and placed into a cavity in the computer housing with a minimal amount of effort and expense. There is no need to assemble a multiplicity of small parts such as the screws and grommets frequently used in previous shock protective mounting arrangements. Moreover, when fitted into the cavity, the center of mass of disk drive 20 will be directly in line with the resultant force imposed on drive 20 by jacket 10 if the computer is subjected to an external shock. Accordingly, there is no danger of the undesirable coupling of translational shocks into rotatory shocks typically experienced in prior art structures.

The shock absorbent jacket discussed above was manufactured from foam rubber or other soft material, preferably having a durometer reading of approximately 40 Shore A. An elastomer or other material formed into a rippled, ribbed, beaded or other pattern may also be used. Examples of such structures are shown in cross section in FIGS. 5A-5E. These structures exhibit a relatively low stiffness or resistance to deformation in the presence of low shock forces such as might be encountered when the computer or other instrument is in operation, while providing a high stiffness in the presence of a large, high-energy shock force and the resulting relatively large displacement. If a ribbed or other patterned material is used, the mechanical stiffness thereof (i.e., the material plus section modulus) should preferably be about the same as that of the foamed material.

Figure 6:
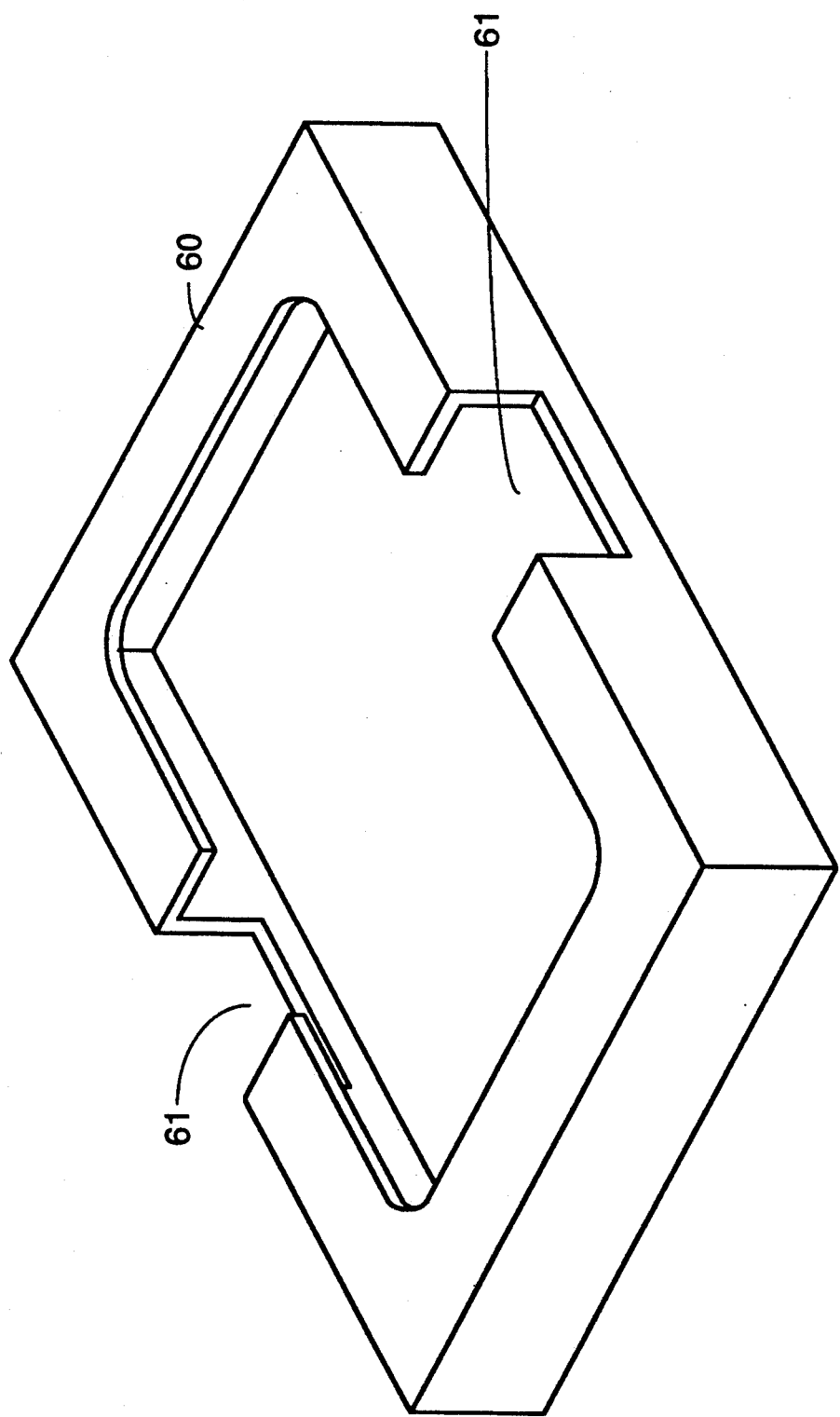
FIG. 6 shows a perspective view of another embodiment of a shock absorbent jacket in accordance with this invention.

A shock absorbent jacket in accordance with this invention may be fabricated in an infinite variety of configurations and may have apertures of various sizes and shapes formed in its surface, provided that, when installed, the jacket provides the component enclosed inside with protection against shocks regardless of the direction from which they originate. Manufacturing considerations may also affect the form of the jacket. For example, FIG. 6 shows a jacket 60 with slots 61 in either side. Jacket 60 could be molded with its ends bent back on one another so that it forms a U-shaped profile when viewed from the side. This would allow it to be easily formed in an injection mold and removed from the mold when completed. Also, several jackets can be used in lieu of a unitary jacket, provided again that they assure protection from shocks in any direction. It will be apparent, for example, that disk drive 20 could be protected by cup-shaped jackets fitted over both ends.

The cavity or recess into which the component is fitted need not be fully enclosed either, so long as it retains the component at an essentially fixed position in relation to the computer or other instrument on which the component is to be mounted and, working in conjunction with the shock absorbent jacket, it protects the component against any shock, whatever the direction. The component could, for example, be placed inside a cage or lattice-type arrangement.

Disk drives (particularly their read/write heads) are frequently subjected to the adverse effects of electromagnetic radiation from sources inside the computer or other instrument in which they are mounted, or beyond. In a computer, for example, electromagnetic interference (EMI) may emanate from the power supply, switching devices or display screen. In addition, electrostatic charge may build up in the drive and may damage the drive when it discharges.

In another embodiment of this invention, the shock absorbent jacket is constructed of an electrically conductive material which protects the drive or other component against electrostatic discharge (ESD) and which shields it against EMI from sources outside the jacket. Available foams and elastomers which contain carbon or metallic particles or fibers dispersed within them will provide adequate ESD protection and some EMI protection. Superior EMI protection will be obtained with foams or elastomers which have metallic wire meshes imbedded in them or bonded to them. For good ESD and EMI protection, it is desirable to provide a jacket which encloses the drive or component on all sides.

While the embodiment described above is designed to protect a computer disk drive, the broad principles of this invention are applicable to a wide range of components, mechanisms and devices—electronic, mechanical or otherwise—all of which are referred to hereinafter individually as "component" and collectively as "components". In fact, the invention is applicable to any component which does not have to be mounted in an absolutely rigid manner. Moreover, a component may be mounted in accordance with this invention or any machine, tool, instrument or other object of any description whatsoever, all of which are referred to hereinafter individually as "instrument" and collectively as "instruments".

Accordingly, the foregoing embodiments in accordance with this invention are intended to be illustrative only and not in any manner limiting of the full scope of this invention. Those skilled in the art will be able to recognize or conceive of numerous alternative embodiments which are within the broad scope and principles of this invention.

We claim:

1. A combination for protecting an electronic, mechanical or electro-mechanical component to be mounted in an instrument against damage from shock forces imposed on the instrument, the combination comprising:

an electronic, mechanical or electro-mechanical component to be mounted in an instrument;

a shock absorbent jacket which at least partially encloses the component; and means for retaining the jacket and the component at a selected location in the instrument;

wherein the jacket and the retaining means function cooperatively so as to protect the component against a shock force applied to the instrument, regardless of the direction of the force, and wherein the shock absorbent jacket comprises a material having a durometer reading of approximately 40 Shore A.

* * * * *